Nov. 8, 1960 A. SANCHEZ 2,959,314
SUCTION VALVE FOR BABY BOTTLE NIPPLE
Filed Dec. 7, 1959 2 Sheets-Sheet 2

INVENTOR.
ALBERT SANCHEZ
BY
ATTORNEY

United States Patent Office 2,959,314
Patented Nov. 8, 1960

2,959,314

SUCTION VALVE FOR BABY BOTTLE NIPPLE

Albert Sanchez, 949 Fox St., Bronx, N.Y.

Filed Dec. 7, 1959, Ser. No. 857,659

8 Claims. (Cl. 215—11)

This invention concerns a nipple for a baby bottle and more particularly involves an improved valve structure for a nipple as well as an improved nipple.

According to the invention there is provided a valve for a nipple which insures a more steady flow of liquid such as water, milk, food juices, etc., from a nipple mounted on a bottle. The valve includes a membrane or diaphragm having a plurality of holes, and a valve plug adapted in one position to close the holes and in another position to open the holes. The diaphragm carries the valve plug and is operated by air pressure or suction applied first to one side of the diaphragm and then to the other side thereof. In an improved form of the invention, the nipple is provided with a massive resilient body and a narrow passage for liquid. This body resists compression to maintain a more even flow of liquid from the nipple.

It is therefore a principal object of the invention to provide a valve structure for a nipple of a baby bottle.

A further object is to provide a valve including a rigid ring, a perforated, flexible diaphragm mounted on the ring, and a plug carried by the diaphragm.

Another object is to provide a nipple for a baby bottle, said nipple having a massive resilient, thick wall body with a narrow passage extending therethrough, and a valve associated with the nipple, said valve including a perforated flexible diaphragm, a plug carried by the diaphragm, and a rigid ring having an annular lip, said lip insuring a tight seal of the perforations of the diaphragm by the plug when the valve is subjected to suction within the bottle and atmospheric pressure in the nipple.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is an exploded perspective view of the several parts of a nipple, valve and bottle assembly according to the invention.

Figure 1:
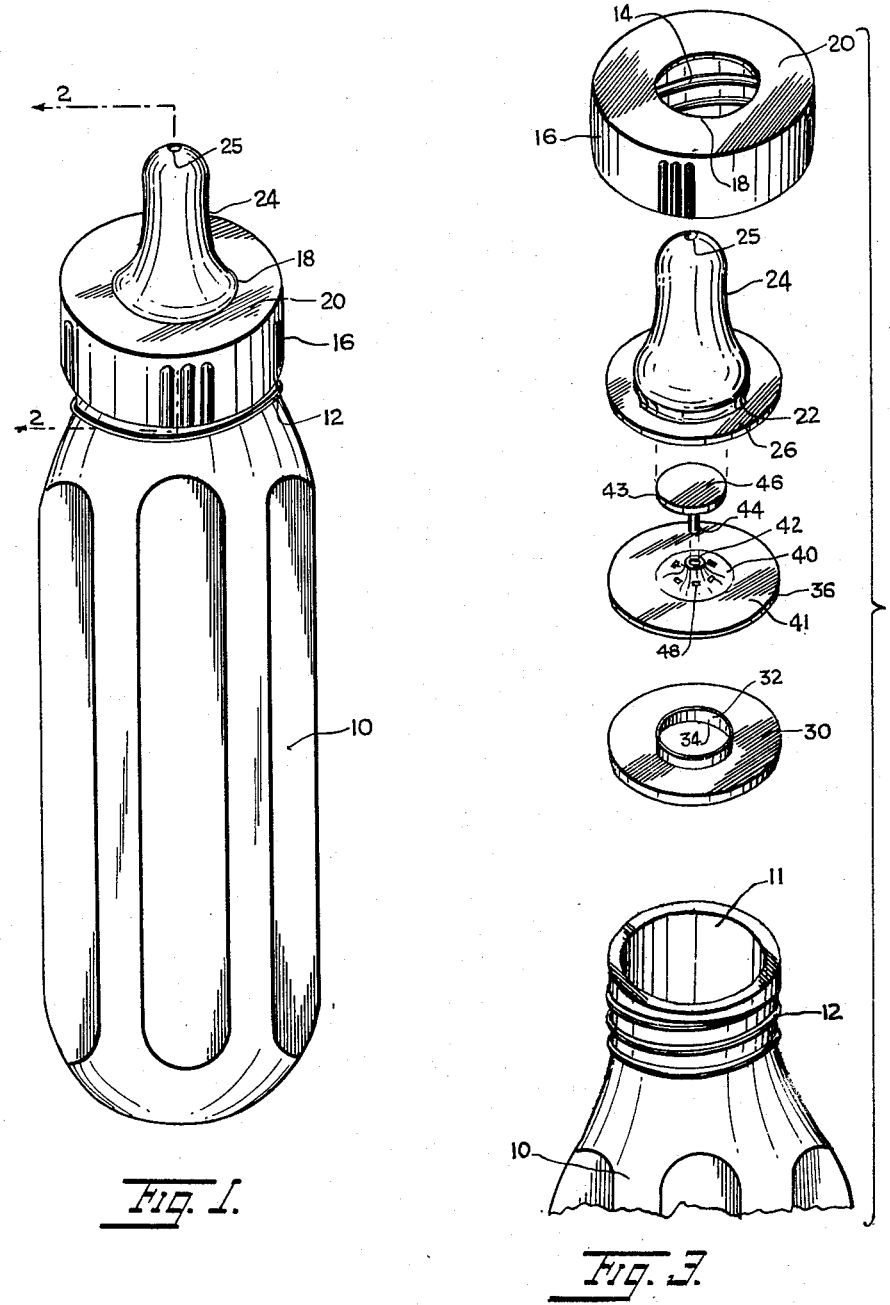
Fig. 1 is a perspective view of a nipple, cap and bottle embodying the invention, the nipple and cap being loosely mounted on the bottle.

Referring to Figs. 1–5, there is shown a glass or plastic bottle 10 having a wide open mouth 11. The open end of the bottle is externally threaded at 12 to engage internal threads 14 of a cap 16. The cap has a central aperture 18 in its circular top 20 in which engages a channel 22 formed at the base of a rubber nipple 24. The nipple has an annular base flange 26 which fits snugly against the underside of the top 20 of the cap. The nipple has a hole 25 in its outer free end. To the extent described, the nipple, cap and bottle structure is conventional.

It has been noted that the flow of liquid from a nipple as shown and described is not wholly uniform due to the erratic manner in which an infant sucks upon a nipple. Air is frequently swallowed with the liquid, resulting in digestive disturbances in the infant. The present invention remedies this condition by the novel valve structure to be described.

Figure 2:
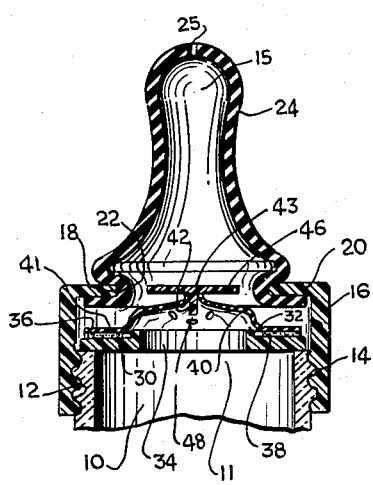
Fig. 2 is a fragmentary sectional view taken on line 2—2 of Fig. 1.
Figure 4:
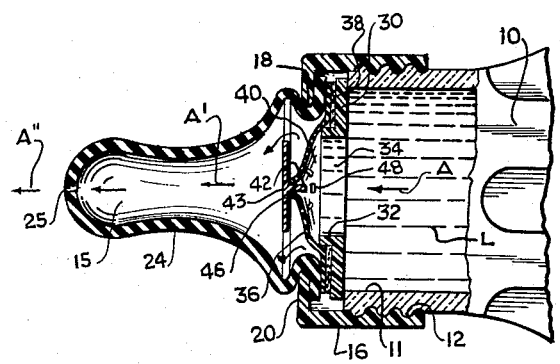
Figs. 4 and 5 are fragmentary sectional views somewhat similar to Fig. 2, showing the valve in two different positions of operation in the nipple and bottle.
Figure 5:
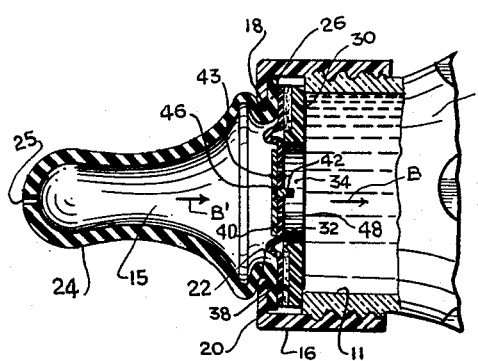

Referring to Figs. 2–4, there is shown a flat, rigid annular ring 30 having an outwardly extending short cylindrical lip 32 at the central opening 34 of the ring. A flexible, circular diaphragm 36 formed of rubber or plastic material is juxtaposed to the ring. If desired, this diaphragm may be attached at its periphery by a cement layer 38 to the ring. The diaphragm is formed with a normally offset circular portion 40 which receives the lip 32 when the ring and diaphragm are juxtaposed as shown in Figs. 2, 4 and 5. The diaphragm has a central opening 42 in which fits a stud 44 of a plug 43. The stud extends axially from a disk-like head 46. The head 46 is received within the lip 32 along with diaphragm portion 40 when the valve is closed, as best shown in Fig. 5. A plurality of holes 48 are formed in the diaphragm portion 40 around opening 42. These holes are blocked by the head 46 when the valve is closed. When the valve is opened as shown in Fig. 4, the head is spaced from the holes 48 and the portion 40 is tensioned to enlarge the holes to a maximum extent.

Figs. 1 and 3 show the cap partially threaded on the bottle so that the flange 26 is spaced from the diaphragm 36. When the cap is fully tightened on the bottle, then the flange 26, diaphragm 36, and ring 40 form a tight seal at the mouth 11 of the bottle.

In operation of the assembled nipple and valve structure, the baby will suck on the nipple which will establish a suction condition in the chamber 15 in the nipple outside of the plug 43 and diaphragm 36. Liquid L in the bottle is under atmospheric pressure and will force the diaphragm portion 40 outwardly as shown in Fig. 4. This will cause the plug 43 to move outwardly and head 46 to clear the holes 42 so that the liquid may pass therethrough under atmospheric pressure. Then as indicated by the arrows A, A', A" the liquid will flow through the passage 15 in the nipple and out through hole 25. The flow of liquid out of the bottle creates a suction condition in the bottle.

When the baby releases the nipple to swallow the discharged liquid, air enters chamber 15 and is applied to the diaphragm portion 40 which retracts, while suction is applied within the bottle. Diaphragm portion 40 and head 46 then enter within lip 32 and the head 46 seals the holes 42 against a flow of air into the bottle and against a flow of liquid L out of the bottle. This inward movement of the diaphragm and disk is indicated by arrows B, B' in Fig. 5. The diaphragm remains in this sealed condition until the baby again sucks on the nipple.

As a consequence of the operation of the valve structure described, liquid is discharged in a uniform flow whenever the baby sucks on the nipple. No liquid is discharged when the nipple is not actually being sucked. Full advantage is taken of the suction and air pressure conditions existing at opposite sides of the valve structure. If the valve structure were not present, the liquid would always fill the nipple and would leak out of the opening 25, when the bottle was in a horizontal position.

Figure 6:
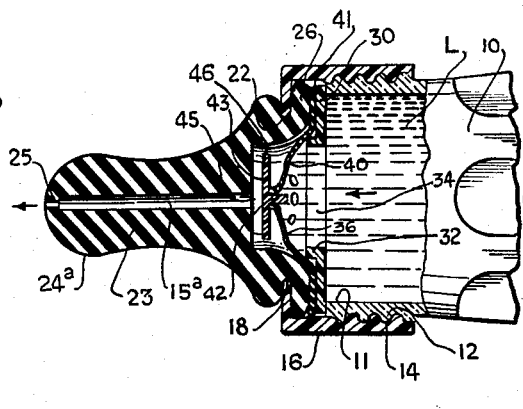
Fig. 6 is a sectional view similar to Fig. 4, showing another form of nipple according to the invention.

In the form of the invention shown in Fig. 6, the nipple 24a is formed with a thick wall structure 23 having a narrow passage 15a. The passage opens into a cavity 45 adapted to receive the head 46 in the open position of the valve. The structure of ring 30, diaphragm 36 and plug 43 is the same as previously described. The thickness of wall 23 exceeds the width or diameter of passage 15a. The adhesive layer 38 is omitted, since the tightening of the cap on the bottle effectively seals the diaphragm periphery 41 and ring 30. An advantage is derived in employing a solid, massive wall structure in the nipple instead of the thin wall structure of nipple 24. When the infant bites the resilient nipple, as frequently occurs, passage 15a may be closed but no effective suction condition is established in cylindrical cavity 45. It is only when the infant sucks vigorously on the nipple in an effort to draw liquid therefrom is a suction condition created for operating the valve structure, expanding the diaphragm portion 40 and clearing holes 42. This is a preferred mode of operation over that of nipple 24, in which a suction condition is established when the infant bites and then releases the thin walled nipple, so that liquid will be discharged through nipple 24 even though the infant may not be actually sucking on the bottle.

According to the present invention as illustrated in Fig. 6, as contrasted with conventional nipple structures, no liquid is discharged unless the infant actually desires the liquid and is ready to swallow it as is manifested by a vigorous sucking on the bottle. This improved nipple structure and associated valve, teaches proper feeding habits to the infant, and minimizes the tendency to swallow air. Conventional nipple structures tend to overfeed an infant by discharging liquid when the infant is only biting on the nipple without any desire to swallow liquid so that the infant is forced to swallow liquid. The present invention avoids this undesirable overfeeding condition. The resilient nipple 24a and its associated valve withhold discharge of liquid when the nipple is bitten without being sucked vigorously and positively.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A valve structure for controlling flow of liquid from a nipple on a baby bottle, comprising an annular ring having a central hole, a flexible diaphragm abutting said ring and having a freely flexible central portion extending across said hole, said central portion having a central opening, a plug having a stud and head, said stud extending through said central opening, said central portion having a plurality of apertures surrounding said central opening, said head closing said apertures in a closed position and being spaced from said apertures in an open position thereof.

2. A valve structure for controlling the flow of liquid from a nipple on a baby bottle, comprising an annular ring having a central opening and an upstanding lip surrounding said opening, a flexible diaphragm having an annular peripheral portion abutting said ring and having a freely flexible central portion extending across said hole and receivable within said lip, and a plug having a circular disk-like head with a stud extending axially therefrom, said stud being inserted through the center of said central portion of the diaphragm and holding the plug thereon, said head being receivable within said lip in juxtaposition to said central portion, said central portion having a plurality of apertures surrounding said stud and closed by said head when said head is disposed within said lip, said head being spaced from said central portion and said apertures being in an enlarged condition when pressure is applied to said central portion to push said central portion out of said opening in the ring.

3. A feeding device for an infant, comprising a bottle having an open mouth, a cap secured over said open mouth, said cap having a central opening, a nipple seated in said opening for discharging liquid from the bottle, and a valve structure disposed between said nipple and said mouth of the bottle, said valve structure comprising an annular ring having a central opening and an upstanding lip surrounding said opening, a flexible diaphragm having an annular peripheral portion abutting said ring and having a freely flexible central portion extending across said hole and receivable within said lip, and a plug having a circular disk-like head with a stud extending axially therefrom, said stud being inserted through the center of said central portion of the diaphragm and holding the plug thereon, said head being receivable within said lip in juxtaposition to said central portion, said central portion having a plurality of apertures surrounding said stud and closed by said head when said head is disposed within said lip, said head being spaced from said central portion and said apertures being in an enlarged condition when pressure is applied to said central portion to push said central portion out of said opening in the ring.

4. A feeding device for an infant, comprising a bottle having an open mouth, a cap secured over said open mouth, said cap having a central opening, a nipple seated in said opening for discharging liquid from the bottle, and a valve structure disposed between said nipple and said mouth of the bottle, said valve structure comprising an annular ring having a central hole, a flexible diaphragm abutting said ring and having a freely flexible central portion extending across said hole, said central portion having a central opening, a plug having a stud and head, said stud extending through said central opening, said central portion having a plurality of apertures surrounding said central opening, said head closing said apertures in a closed position and being spaced from said apertures in an open position thereof.

5. A feeding device for an infant, comprising a bottle having an open mouth, a cap secured over said open mouth, said cap having a central opening, a nipple seated in said opening for discharging liquid from the bottle, and a valve structure disposed between said nipple and said mouth of the bottle, said valve structure comprising an annular ring having a central opening and an upstanding lip surrounding said opening, a flexible diaphragm having an annular peripheral portion abutting said ring and having a freely flexible central portion extending across said hole and receivable within said lip, and a plug having a circular disk-like head with a stud extending axially therefrom, said stud being inserted through the center of said central portion of the diaphragm and holding the plug thereon, said head being receivable within said lip in juxtaposition to said central portion, said central portion having a plurality of apertures surrounding said stud and closed by said head when said head is disposed within said lip, said head being spaced from said central portion and said apertures being in an enlarged condition when pressure is applied to said central portion to push said central portion out of said opening in the ring, said nipple having a massive wall structure with a narrow passage for said liquid extending therethrough, the thickness of said wall structure exceeding the width of said passage.

6. A feeding device for an infant, comprising a bottle having an open mouth, a cap secured over said open mouth, said cap having a central opening, a nipple seated in said opening for discharging liquid from the bottle, and a valve structure disposed between said nipple and said mouth of the bottle, said valve structure comprising an annular ring having a central opening and an upstanding lip surrounding said opening, a flexible diaphragm having an annular peripheral portion abutting said ring and having a freely flexible central portion extending across said hole and receivable within said lip, and a plug having a circular disk-like head with a stud extending axially therefrom, said stud being inserted through the center of said central portion of the diaphragm and holding the plug thereon, said head being receivable within said lip in juxtaposition to said central portion, said central portion having a plurality of apertures surrounding said stud and closed by said head when said head is disposed within said lip, said head being spaced from said central portion and said apertures being in an enlarged condition when pressure is applied to said central portion to push said central portion out of said opening in the ring, said nipple having a massive wall structure with a narrow passage for said liquid extending therethrough, the thickness of said wall structure exceeding the width of said passage, and a cavity formed in the nipple and communicating with said passage, said head being receivable within said cavity in an open condition of said valve structure.

7. A feeding device for an infant, comprising a bottle having an open mouth, a cap secured over said open mouth, said cap having a central opening, a nipple seated in said opening for discharging liquid from the bottle, and a valve structure disposed between said nipple and said mouth of the bottle, said valve structure comprising an annular ring having a central hole, a flexible diaphragm abutting said ring and having a freely flexible central portion extending across said hole, said central portion having an central opening, a plug having a stud and head, said stud extending through said central opening, said central portion having a plurality of apertures surrounding said central opening, said head closing said apertures in a closed position and being spaced from said apertures in an open position thereof, said nipple having a massive wall structure with a narrow passage for said liquid extending therethrough, the thickness of said wall structure exceeding the width of said passage.

8. A feeding device for an infant, comprising a bottle having an open mouth, a cap secured over said open mouth, said cap having a central opening, a nipple seated in said opening for discharging liquid from the bottle, and a valve structure disposed between said nipple and said mouth of the bottle, said valve structure comprising an annular ring having a central hole, a flexible diaphragm abutting said ring and having a freely flexible central portion extending across said hole, said central portion having a central opening, a plug having a stud and head, said stud extending through said central opening, said central portion having a plurality of apertures surrounding said central opening, said head closing said apertures in a closed position and being spaced from said apertures in an open position thereof, said nipple having a massive wall structure with a narrow passage for said liquid extending therethrough, the thickness of said wall structure exceeding the width of said passage, and a cavity formed in the nipple and communicating with said passage, said head being receivable with said cavity in an open condition of said valve structure.

References Cited in the file of this patent

FOREIGN PATENTS 318,467    France ---------------- Oct. 16, 1902